(12) United States Patent
Koschinat

(10) Patent No.: US 7,900,942 B2
(45) Date of Patent: Mar. 8, 2011

(54) WHEEL SUSPENSION ARM

(75) Inventor: Hubert B. Koschinat, Hösbach (DE)

(73) Assignee: SAF-Holland GmbH, Bessenbach (DE)

( * ) Notice: Subject to any disclaimer, the term of this patent is extended or adjusted under 35 U.S.C. 154(b) by 200 days.

(21) Appl. No.: 12/063,335

(22) PCT Filed: Aug. 9, 2006

(86) PCT No.: PCT/EP2006/007901
§ 371 (c)(1),
(2), (4) Date: Nov. 12, 2008

(87) PCT Pub. No.: WO2007/020003
PCT Pub. Date: Feb. 22, 2007

(65) Prior Publication Data
US 2009/0212523 A1    Aug. 27, 2009

(30) Foreign Application Priority Data

Aug. 12, 2005   (DE) .................. 10 2005 038 274

(51) Int. Cl.
*B60G 3/08*    (2006.01)
(52) U.S. Cl. ..... 280/124.111; 280/124.116; 280/124.128
(58) Field of Classification Search ........... 280/124.111, 280/124.116, 124.128
See application file for complete search history.

(56) References Cited

U.S. PATENT DOCUMENTS

| | | | |
|---|---|---|---|
| 5,116,075 A * | 5/1992 | Pierce | ................... 280/124.116 |
| 5,375,871 A | 12/1994 | Mitchell et al. | |
| 5,800,024 A | 9/1998 | Steimmel et al. | |
| 6,340,165 B1 | 1/2002 | Kelderman | |
| 6,659,488 B1 | 12/2003 | Beresnitzky et al. | |
| 7,007,960 B2 * | 3/2006 | Chalin et al. | ........... 280/124.116 |
| 7,347,435 B2 * | 3/2008 | Chalin | ................... 280/124.116 |
| 7,455,306 B2 * | 11/2008 | Ramsey et al. | ......... 280/124.128 |
| 7,513,517 B2 * | 4/2009 | Barton et al. | .......... 280/124.116 |
| 7,669,866 B2 * | 3/2010 | Peaker et al. | .......... 280/124.128 |
| 7,722,064 B2 * | 5/2010 | Stuart et al. | ............ 280/124.128 |
| 2003/0146592 A1 * | 8/2003 | Chalin et al. | ............ 280/124.116 |
| 2004/0036246 A1 | 2/2004 | Chan et al. | |
| 2006/0113742 A1 | 6/2006 | Chan et al. | |

FOREIGN PATENT DOCUMENTS

DE    33 33 525 A1    4/1984

(Continued)

OTHER PUBLICATIONS

Translation of International Preliminary Report on Patentability for International Application No. PCT/EP2006/007901, filed Aug. 9, 2006.

*Primary Examiner* — Toan C To
(74) *Attorney, Agent, or Firm* — Price, Heneveld, Cooper, DeWitt & Litton, LLP

(57) ABSTRACT

A wheel suspension arm comprises a link opening (12) for pivotably securing the wheel suspension arm to a vehicle frame and an axle opening (11) for securing an axle element (2) to the wheel suspension arm. A peripheral edge (11a) of the axle opening includes at least one discontinuation, such as a slot (13). A screw (17) can be tightened to clamp the axle element (2) in the axle opening (11). The invention also relates to a method for producing the inventive wheel suspension arm and to a wheel suspension comprising said wheel suspension arm.

18 Claims, 4 Drawing Sheets

FOREIGN PATENT DOCUMENTS

| | | | |
|---|---|---|---|
| DE | 296 16 257 U1 * | 12/1996 | |
| DE | 196 03 764 A1 | 8/1997 | |
| EP | 1 315 626 A0 | 6/2003 | |
| WO | WO 01/53779 A1 | 7/2001 | |
| WO | WO 03/066355 A1 | 8/2003 | |
| WO | 2004054825 A2 * | 7/2004 | |
| WO | 2005025900 A1 * | 3/2005 | |

* cited by examiner

WHEEL SUSPENSION ARM

BACKGROUND OF THE INVENTION (1) Field of the Invention

The present invention concerns a wheel suspension arm, especially a trailing arm for a vehicle, as well as a wheel suspension with such a wheel suspension arm.

(2) Description of the Related Art

In the prior art, according to utility model number DE 296 16 257 U1, a rigid axle consisting of an axle tube is led through a pair of boxlike trailing arms and welded to the trailing arms. In order to make possible a welding of the trailing arms to the axle tube, they must be fabricated of a material that lends itself to welding with the material of the axle tube, such as steel. Furthermore, any after treatment, such as rust prevention and painting, can only be applied after the welding.

One can avoid a welding of the trailing arms to the rigid axle if the trailing arms are each clamped by a pair of U-shaped steel shackles to the rigid axle, as is shown in FIG. 4. This type of axle fixation is especially suitable when using leaf springs. But when using air springing, this type of fixation requires a plurality of individual parts and a relatively high cost of assembly/disassembly of the trailing arm, since each trailing arm is provided with additional positioning parts, and one has to tighten up four screws for each trailing arm.

SUMMARY OF THE INVENTION

The present invention provides a wheel suspension arm for a vehicle, which can be fabricated cheaply and can be mounted/dismounted in simple fashion. Another aspect of the present invention is a corresponding method and a wheel suspension with such a wheel suspension arm.

According to one aspect of the present invention, a wheel suspension arm is created, especially a trailing arm for a vehicle, with: a link opening for the pivoting fixation of the wheel suspension arm to a vehicle frame and an axle opening for the fixation of an axle element to the wheel suspension arm, wherein the axle opening has at its peripheral edge at least one interruption or recess, such as a slot.

Since the wheel suspension arm is simply clamped onto an axle tube, it can be easily mounted and dismounted. Furthermore, a wheel suspension with such a wheel suspension arm has a minimal number of structural parts. The axle tube and the wheel suspension arm can receive a rust preventative, a coat of paint or the like prior to the mounting, since welding is no longer necessary. Since the axle opening has essentially the same diameter as the corresponding segment of the axle element, a clamping is produced which can transmit a high torque. The axle opening preferably has a transition fit. However, it is also possible to provide a clearance fit with a slight play of around 0.05 mm to 0.5 mm, or a press fit, in which the axle opening has a slightly smaller diameter than the axle element. In this case, the trailing arm can be heated for installation, so as to widen the diameter, or the wheel suspension arm can be pressed onto the axle element. Furthermore, the peripheral edge of the axle opening can be spread open at the interruption, in order to widen the diameter.

Preferably, a fastening means is arranged in order to decrease the interruption or a dimension/distance of the interruption so that the wheel suspension arm can be clamped on the axle element.

Furthermore, the axle opening may be generally round, with the axle opening having about the same diameter as a corresponding segment of the axle element. But the axle opening can also have other configurations, for example, if the axle element has a square cross section, an oval cross section, or other cross section configurations which are technically feasible, as long as the cross section configurations used have a largely closed cross section. In place of axle elements, it is also possible to insert steering knuckle holders outwardly, or torsion elements, such as those in the form of a transverse strut, connecting the two wheel suspension arms, of appropriate cross sectional configurations, inwardly into the axle opening of the wheel suspension arm, and then corresponding axle elements are arranged on them. It is also conceivable to divide up the functions, in which case the steering knuckle holders and the torsion element do not lie in the same axial line, but rather on axes running parallel to each other. In this case, if the distance is suitably chosen, both the torsion element and the steering knuckle holder can then be fastened in two axle openings by clamping.

Advisedly, the axle opening is essentially adapted to the configuration of the corresponding axle element.

The interruption may be formed by a slot, which ends in a recess formed in the wall region of the wheel suspension arm, such as in the form of a round or oval opening, or it is taken as far as the outer edge of the wheel suspension arm. In this way, the formation of stress cracks at one end of the interruption or slot is avoided.

Preferably the wheel suspension arm is cast from spherulitic graphite iron GGG, gray cast iron GG, or vermicular graphite cast iron GGV, so that is can be produced in economical manner.

Furthermore, a receiving element for a spring of the vehicle axle and fastening means for a shock absorber are arranged on the wheel suspension arm.

Moreover, it is also preferable that at least one engaging means is arranged for a form-fitted engagement of the axle opening with an axle element, so that the axle element can be easily positioned in the trailing arm. Furthermore, the engaging means can form a fail-safe function in event of failure of the clamping and/or an indicator function to detect an undesirable twisting of the axle element.

The wheel suspension arm of the invention preferably has a T-profile or an essentially open double-T profile, so that the wheel suspension arm has high torsional and bending strength.

Furthermore, a method is created for the production of a wheel suspension arm for a vehicle, with the following steps: production, for example, by casting, of a wheel suspension arm with an axle opening to receive an axle element and providing of an interruption, such as in the form of a slot, at the peripheral edge of the axle opening.

Advantageously, a fastening means can be provided in the region of the interruption, in order to provide an additional clamping if necessary.

Preferably, at least one engaging means is configured for a form-fitting engagement of the axle opening with an axle element.

Finally, a wheel suspension is created with a tube axle as an axle element and a pair of wheel suspension arms according to the invention, wherein the wheel suspension is moreover preferably provided with a clamped brake holder, so that the trailing arm or the axle tube can be dismounted from the axle tube after the clamped brake holder has first been dismounted.

DETAILED DESCRIPTION OF THE PREFERRED EMBODIMENTS

Figure 1:
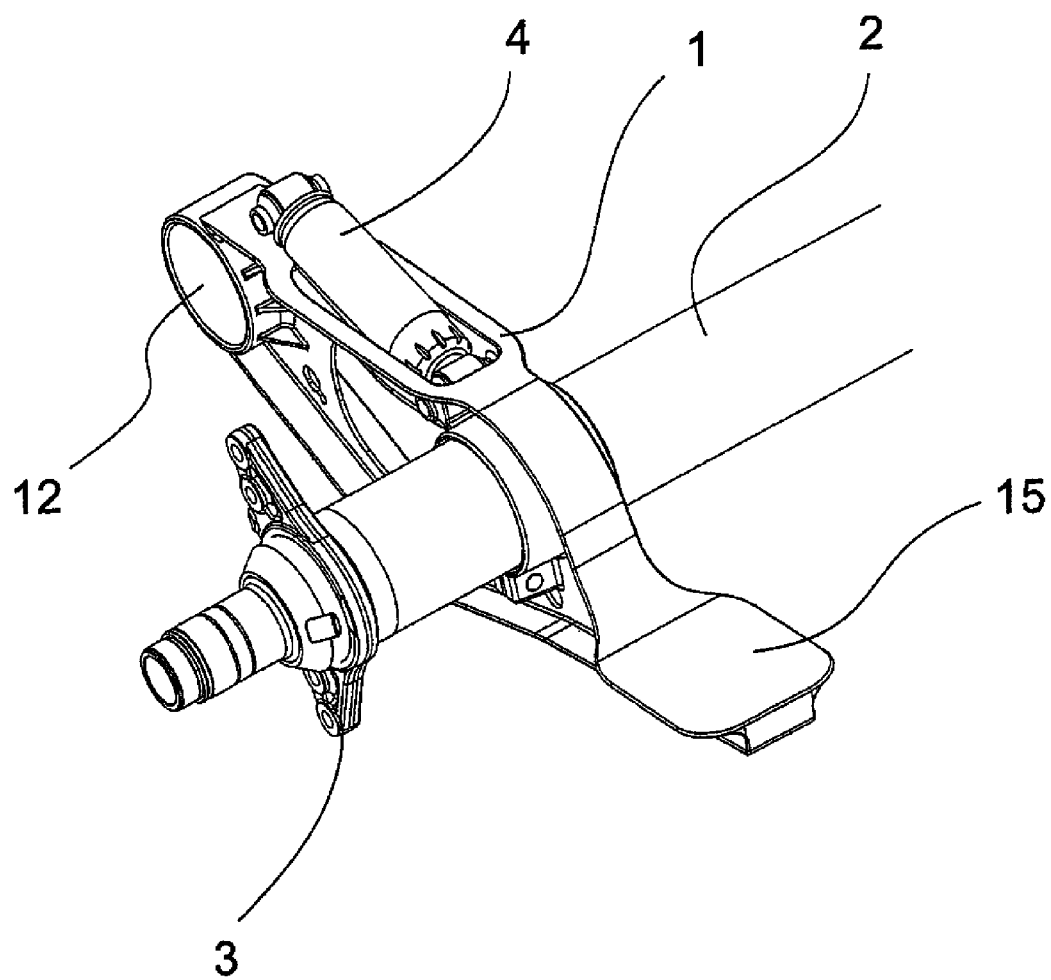
FIG. 1 is a partially fragmentary isometric view of a wheel suspension with a trailing arm 1, and axle tube 2 and a clamped brake holder 3 according to the present invention.
Figure 2:
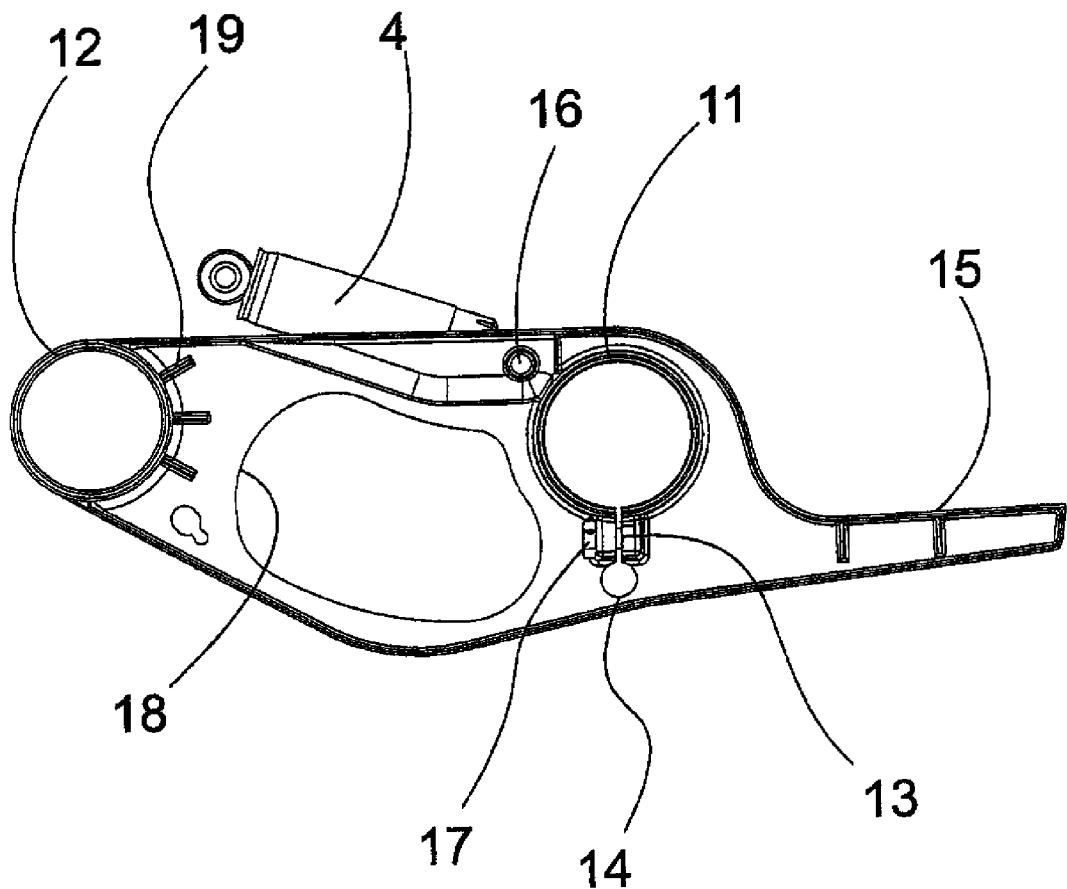
FIG. 2 is a side view of the trailing arm 1 with a shock absorber 4 arranged thereon.

As is shown in FIG. 1, an axle tube 2 of a rigid axle extends through an axle opening 11 of a trailing arm 1 and a clamped brake holder 3 is arranged at one end of the axle tube 2. Furthermore, a shock absorber 4 is arranged on the trailing arm 1 and the trailing arm 1 has a spring receptacle 15 as well as a link opening 12. The trailing arm 1 is pivoted via the link opening 12 on a vehicle frame (not shown), for example, via a rubber-metal element. Furthermore, a spring element (not shown) is installed between a vehicle frame and the spring receptacle 15 of the trailing arm 1. The spring element preferably comprises an air spring (not shown). The axle tube 2 likewise has a trailing arm 1 on the other side of the vehicle (not shown), so that the wheel suspension is formed by a pair of trailing arms 1 and an axle tube 2.

Figure 3:
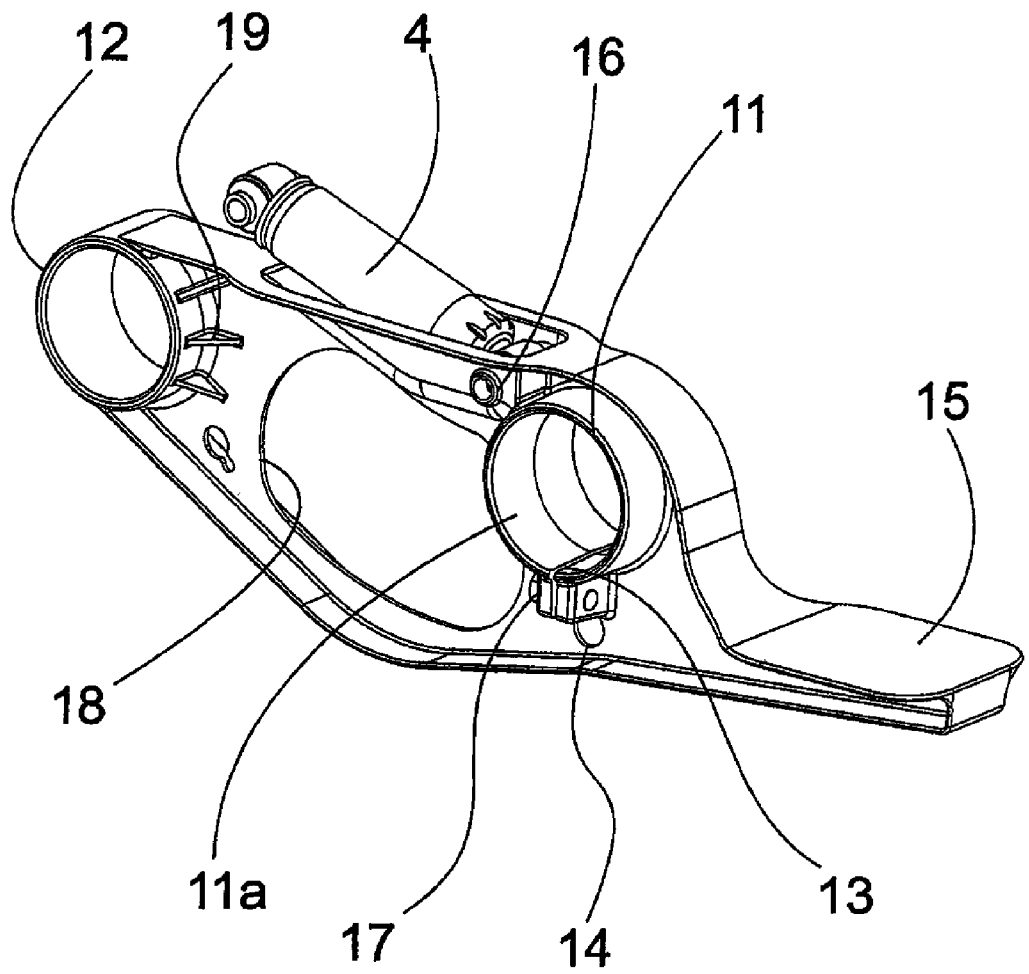
FIG. 3 is an isometric view of the trailing arm 1 with a shock absorber 4 arranged thereon.
Figure 4:
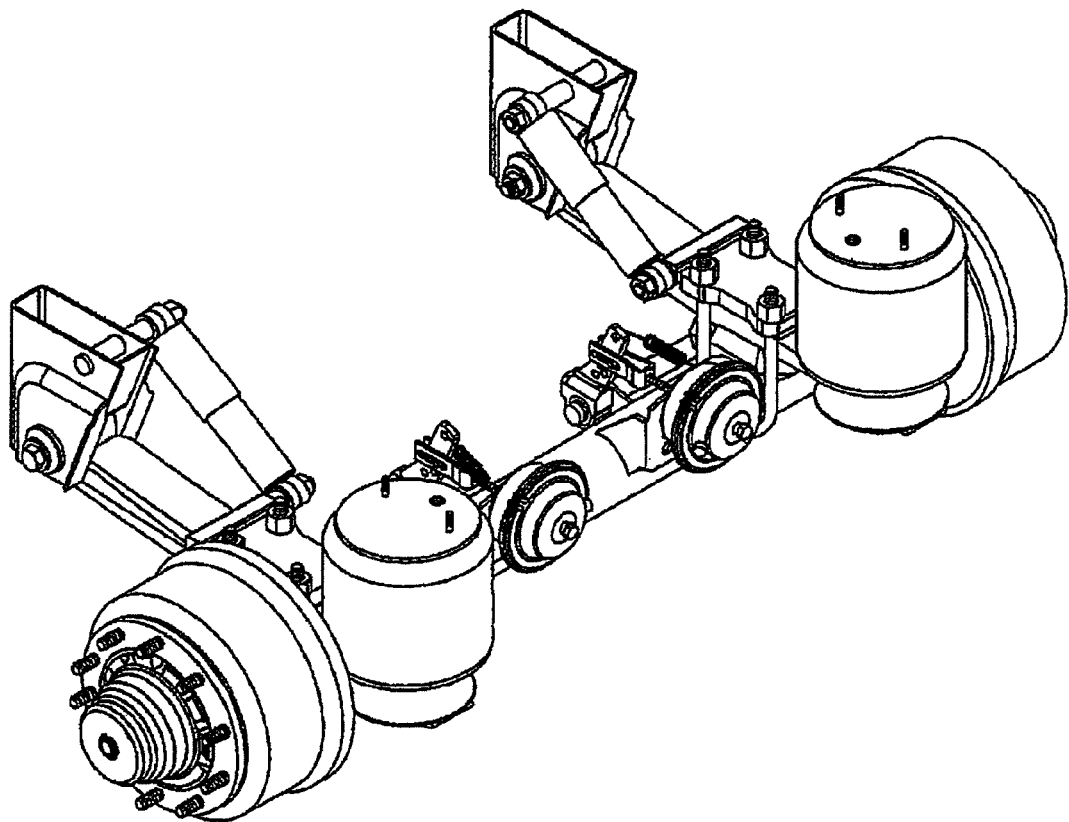
FIG. 4 is an isometric view of a prior art wheel suspension with a pair of trailing arms and a rigid axle.

The trailing arm 1 is preferably made from gray cast iron, such as GG-60, spherical graphite cast iron (spherulitic cast iron GGG) or vermicular graphitic cast iron (GGV) and has a double-T profile with an opening 18, as is best seen from FIG. 3. A trailing arm 1 of gray cast iron is especially cheap to produce, while a trailing arm 1 of spherical graphite cast iron GGG or vermicular graphite cast iron GGV has greater strength.

The link opening 12 and the axle opening 11 can be worked further after being produced, in order to form an even better snug fit. The diameter of the axle opening 11 essentially corresponds to the diameter of the axle element or axle tube 2 on which the trailing arm 1 is seated. Furthermore, a peripheral edge 11a of the axle opening 11 has a recess or interruption 13, for example, in the form of a slot, so as to make possible a clamping of the axle opening 11 on the axle element via a fastening means, such as a clamping screw 17. In other words, a width of the interruption 13 is decreased by tightening the clamping screw 17, thereby making possible a clamping of the trailing arm 1 on an axle element. However, other clamping devices can also be used in order to decrease the interruption, or the distance produced by the interruption in this region, to achieve a clamping.

The snug fit of the axle opening 11 is preferably designed as a transition fit, i.e., the diameter of the axle opening 11 essentially corresponds to the diameter of the axle element on which the trailing arm 1 is mounted. In other words, the diameter of the axle opening 11 has both an upward tolerance (play) and a downward tolerance (pressing). Due to the transition fit, a fastening of the trailing arm 1 on the axle element is achieved, which can transmit a high torque and can prevent a shifting of the axle element in the sideways direction in reliable manner, while at the same time the production costs can be kept low, since the tolerance of the snug fit is not very narrow. Furthermore, a high yield can be achieved, since the relatively large tolerance of the snug fit reduces the number of rejects in the fabrication of the trailing arm. The tolerance should lie in the range of +/−0.05 to 0.5 mm, best of all in the range of 0.2 to 0.4 mm.

For an easy installation, the trailing arm 1 can be heated and/or spread apart.

For applications with lower strength requirements, the snug fit can contain a clearance fit with a play of 0.05 to 0.5 mm, in order to make possible an especially easy installation. Alternately, when particularly high requirements are placed on the strength, a press fit can be chosen.

The trailing arm 1 of the invention can receive a surface treatment, such as rust prevention and painting, prior to being installed. This offers the benefit that no special rust prevention is needed during storage as a replacement part and the applying of a rust prevention and/or a coat of paint after installation on a vehicle can be dispensed with. In other words, a trailing arm 1 according to the invention is taken out of the warehouse and simply screwed onto the wheel suspension of a vehicle. Other processing steps such as applying of rust prevention and painting, as are necessary in the prior art, can be dispensed with.

In order to further improve the clamping of the axle opening 11 on an axle element, the axle opening 11 can be further glued together with the axle element by means of suitable adhesive or provided with friction-increasing treatments.

Furthermore, an additional engaging means such as one in the form of a projection (not shown) or a groove (not shown) can be provided at the peripheral edge 11a of the axle opening 11. This engaging means allows for an easy positioning during the installation and it can also make possible a fail-safe function, i.e., if the frictional connection of the clamp fails, the axle tube is held securely by a form fitting due to this additional engaging means. Moreover, the engaging means can in addition or solely take on an indicator function in regard to an unwanted twisting of the axle element.

Furthermore, the trailing arm 1 of the invention has a spring receptacle 15 at a rear end segment as well as fastening means 16, for example, in the form of a screw opening for a shock absorber 4. The link opening 12 is preferably braced by a plurality of ribs 19 against the body of the trailing arm 1, in order to increase the flexural and torsional strength in a transverse direction. These ribs 19 are formed, for example, during a casting process.

The invented trailing arm 1 is produced by casting from gray cast iron, spherulitic cast iron, or vermicular graphite cast iron, with all of the elements being cast on the unit. In other words, the trailing arm 1 of the invention is made as a single piece by casting and only the axle opening 11 and the link opening 12 may require further machining.

Preferably, a pair of such trailing arms 1 is used for a wheel suspension, and preferably a rigid steel tube axle is pushed through the axle openings 11 of the pair of trailing arms 1 and clamped to them by the clamping screw 17. However, it is also possible in the case of a single wheel suspension to only push one short axle element through the axle opening 11 of a single trailing arm 1. In the case of the rigid axle, the wheel suspension can have a clamped brake holder 3, as is best seen in FIG. 3, so that the trailing arm 1 can be dismounted in easy fashion by removing the link at the link opening 12, taking off the clamped brake holder 3, and then opening the axle opening 11 by means of the clamping screw 17 so as to pull the trailing arm 1 out from the axle tube 2. In this way, a trailing arm 1 can be easily replaced on a vehicle.

However, the trailing arm 1 can also consist of several parts which are screwed together. Although it is not depicted here, the trailing arm 1 can be divided roughly at the middle of the axle opening 11 and then be screwed together with a pair of clamping screws 17. In order to achieve a high flexural and torsional strength of the trailing arm 1, it has a double-T profile with a large opening 18 in a central middle segment, in order to economize on weight. The weight savings due to the large opening 18 results in a reduction in nonsuspended masses of the vehicle provided with this wheel suspension, so that the road quality can be improved. The fastening means 16 for the shock absorber 4 are preferably arranged in a cast cavity in order to reduce an installation space for a shock absorber 4 of the wheel suspension.

However, the invention is not limited to the sample embodiment shown here. In particular, the following modifications of the sample embodiment are possible:

1) The trailing arm can also be made from another material, such as aluminum or an aluminum alloy or another suitable light metal, for example, by casting.

2) The spring receptacle 15 and the fastening means 16 for the shock absorber 4 of the vehicle axle can be arranged on the axle itself, so that these are not arranged on the trailing arm 1.

3) The trailing arm can have a profile different from the double-T profile shown here. For example, the trailing arm 1 can have a square profile or a T-profile. But any other profile is also conceivable, as long as the profile has high torsional and flexural strength.

4) Although the sample embodiment shown shows a trailing arm for a pulled rigid axle, the wheel suspension arm of the invention can also be configured as a pushed trailing arm, a transverse link, tilted link, or space link.

5) Although the sample embodiment shown here shows a nonlinked rigid rear axle, the wheel suspension arm of the invention can also be used for a front axle and/or a linkable axle, if the axle opening 11 encloses a corresponding axle element of such an axle.

6) Although the use of a steel tube axle is proposed, other materials with suitable geometry and material characteristics can also be used, such as fiber-reinforced metals or plastics.

The invention claimed is:

1. A wheel suspension arm for a vehicle, the suspension arm comprising:
    an arm structure having a link opening for pivoting connection of the arm structure to a vehicle, and an axle opening for connecting an axle to the arm structure, wherein the axle opening defines a peripheral edge having at least one gap forming an interruption; and:
    a clamp configured to reduce a size of the gap and clamp the arm structure to an axle extending through the axle opening, wherein the arm structure and the clamp are made as a continuous single piece by casting.

2. The wheel suspension arm of claim 1, wherein:
    the clamp includes a fastener configured to decrease a size of the gap so that the wheel suspension arm can be clamped on an axle element.

3. The wheel suspension arm of claim 1, including:
    an axle element has a cylindrical outer surface portion defining an outer diameter; and wherein:
    the axle opening is generally circular and defines an inner surface about the same diameter as the outer diameter of the axle element.

4. The wheel suspension arm of claim 1, including:
    an axle having an outer surface defining a shape; and wherein:
    the axle opening has an inner surface defining a shape corresponding to the shape of the outer surface of the axle.

5. The wheel suspension arm of claim 1, wherein:
    the interruption comprises a slot which ends in a generally rounded opening.

6. The wheel suspension arm of claim 1, wherein:
    the wheel suspension arm is cast from spherulitic graphite iron GGG, gray cast iron GG, or vermicular graphite cast iron GGV.

7. The wheel suspension arm of claim 1, including:
    a receiving element for a spring, and a fastener configured to connect a shock absorber.

8. The wheel suspension arm of claim 1, wherein:
    the arm structure includes a generally vertical web, and a circular flange extending transversely from the vertical web to define the axle opening.

9. The wheel suspension arm of claim 1, wherein:
    the arm structure has a T-profile or a double-T profile.

10. A method for production of a suspension assembly for a vehicle, the method comprising:
    casting a one piece wheel suspension arm having an axle opening defining an integral peripheral edge and an interruption at the peripheral edge forming an integral clamp to permit a dimension of the axle opening to be decreased;
    providing an axle element;
    positioning at least a portion of the axle element in the axle opening;
    clamping the axle element in the axle opening.

11. The method of claim 10, including:
    providing a fastener in the region of the interruption; and
    moving the fastener to clamp the axle in the axle opening.

12. A method for production of a suspension assembly for a vehicle, the method comprising:
    fabricating a wheel suspension arm having an axle opening defining a peripheral edge and an interruption at the peripheral edge to permit a dimension of the axle opening to be decreased;
    providing an axle element;
    positioning at least a portion of the axle element in the axle opening;
    clamping the axle element in the axle opening;
    the wheel suspension arm is formed by casting, and wherein:
    the wheel suspension arm comprises a one piece cast structure with the peripheral edge integrally formed therewith; and
    the one piece cast structure includes a vertical web extending around a substantial portion of the axle opening, and an integral flange projecting transversely from the vertical web, the flange defining a generally cylindrical inner surface forming at least a portion of the axle opening.

13. A vehicle suspension system, comprising:
    an axle;
    a pair of suspension arms connected to the axle, each suspension arm comprising an arm structure made as a single piece by casting and having a link opening for connecting the suspension arm to a vehicle, the arm structure including an axle opening defining a size, and including material cast integrally with the arm structure and surrounding the axle opening and forming a discontinuity, each suspension arm including a clamp decreasing the size of the axle opening and rigidly clamping the arm structures to the axle.

14. A vehicle suspension system, comprising:
    an axle;
    a pair of suspension arms connected to the axle, each suspension arm comprising an arm structure having a link opening for connecting the suspension arm to a vehicle, the arm structure including an axle opening defining a size, and including material formed integrally with the arm structure and surrounding the axle opening and forming a discontinuity, each suspension arm including a clamp decreasing the size of the axle opening and rigidly clamping the arm structures to the axle; and the material surrounding the axle opening comprises a generally vertical web, and a flange extending transversely from the web.

15. The vehicle suspension system of claim 13, wherein:
the material surrounding the axle opening defines a generally cylindrical surface and a gap forming the discontinuity, the gap defining a dimension that is reduced by the clamp.

16. A vehicle suspension system, comprising:
an axle;
a pair of suspension arms connected to the axle, each suspension arm comprising an arm structure having a link opening for connecting the suspension arm to a vehicle, the arm structure including an axle opening defining a size, and including material formed integrally with the arm structure and surrounding the axle opening and forming a discontinuity, each suspension arm including a clamp decreasing the size of the axle opening and rigidly clamping the arm structures to the axle;
the material surrounding the axle opening defines a generally cylindrical surface and a gap forming the discontinuity, the gap defining a dimension that is reduced by the clamp, and wherein the material surrounding the axle forms a vertical web, the web having a slot therethrough with a first end defining the gap, and a second end spaced apart from the gap, the second end having a generally circular shape having a diameter that is substantially greater than the dimension of the gap.

17. A wheel suspension arm for a vehicle, the suspension arm comprising:
a one piece cast arm structure having a link opening for pivoting connection of the arm structure to a vehicle, and an axle opening for connecting an axle to the arm structure, wherein the axle opening defines a peripheral edge having at least one gap forming an interruption, and an integrally cast clamp configured to reduce a size of the gap and clamp the arm structure to an axle extending through the axle opening, and wherein the cast arm structure is substantially free of welds around the entire peripheral edge.

18. The wheel suspension arm of claim 17, including:
an axle element has a cylindrical outer surface portion defining an outer diameter, and wherein:
the axle opening is generally circular and defines an inner surface about the same diameter as the outer diameter of the axle element.

* * * * *